Feb. 16, 1932.  E. M. CLAYTOR  1,845,489
CONTROL SYSTEM
Filed Jan. 10, 1929   3 Sheets-Sheet 1

Fig.1.

INVENTOR
Edward M. Claytor.
BY
Wesley J. Carr
ATTORNEY

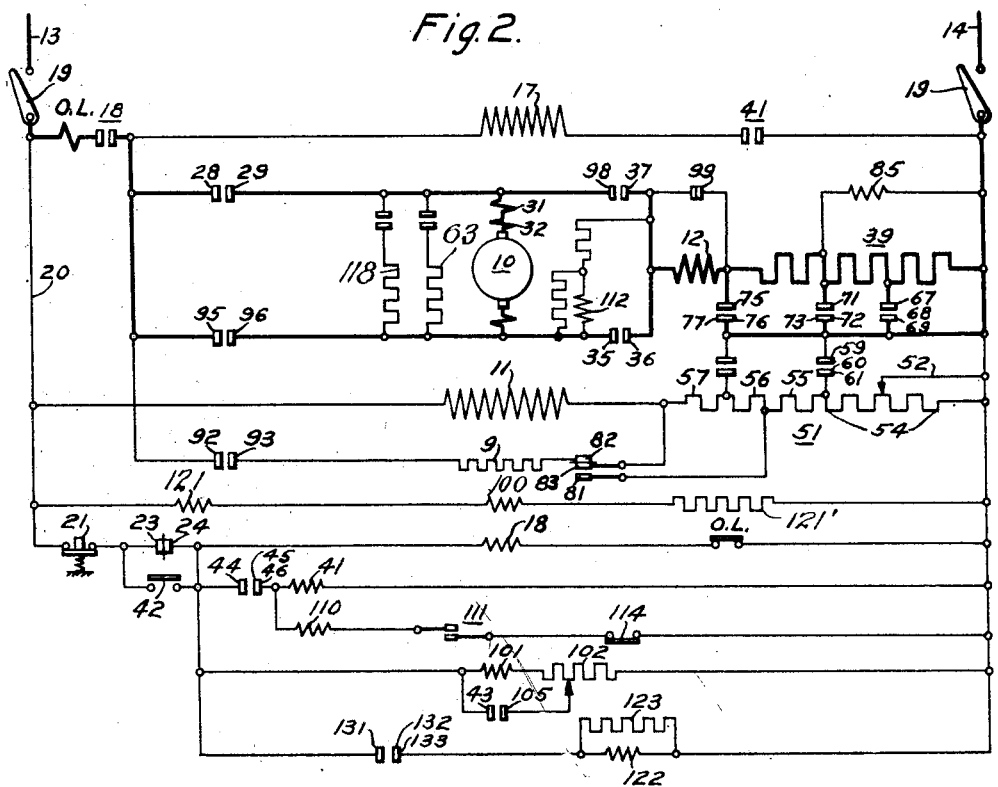

Feb. 16, 1932.  E. M. CLAYTOR  1,845,489
CONTROL SYSTEM
Filed Jan. 10, 1929  3 Sheets-Sheet 3

INVENTOR
Edward M. Claytor.
ATTORNEY

Patented Feb. 16, 1932

1,845,489

UNITED STATES PATENT OFFICE

EDWARD M. CLAYTOR, OF WILKINSBURG, PENNSYLVANIA, ASSIGNOR TO WESTINGHOUSE ELECTRIC & MANUFACTURING COMPANY, A CORPORATION OF PENNSYLVANIA

CONTROL SYSTEM

Application filed January 10, 1929. Serial No. 331,406.

My invention relates generally to control systems for electric motors and more particularly to control systems for hoisting motors, which may be utilized for operating high-speed cargo winches, cranes, and machines of similar nature.

In the operation of cargo winches which may be utilized for handling ship cargos, the most desirable feature of the system is that of maximum speed of operation under all load conditions. A concrete example is the well known Burtoning-winch system which utilizes two separate hoisting units or motor-driven winches, which are preferably located on the deck of the ship. In this system, two hoisting booms are provided, which are also secured to the deck of the ship near the hatch through which the cargo is to be moved. Each winch is provided with a hoisting cable, one cable extending through the blocks on one boom and the other through the blocks of the other boom, and both are connected to the hook or sling or whatever may be utilized for handling the cargo.

The booms are usually mounted in fixed positions and are so arranged that one extends directly over the deck of the ship and the other over the loading dock in any desired position. This arrangement makes it possible to hoist from the hold of the ship by utilizing one boom and motor winch in strictly a hoisting capacity, while the other is utilized to swing the load over the dock and then perform a lowering operation. It is evident that the reverse operation of transferring cargo from the dock to the ship may be as readily performed.

To facilitate the operation of this system, it is very desirable that winch motors and control be provided which shall have operating characteristics particularly suited for the particular application since it is important that the highest possible hoisting and lowering speeds, compatible with safe operation, shall be obtainable for all loads ranging from empty-hook load to full-load capacity of the winch.

Furthermore, since the co-operation of both motor winches is required in shifting cargo, as explained hereinbefore, it becomes necessary to provide motors which are capable of having their operating characteristics changed in accordance with the kind of operation they are to perform.

In considering the operation of this system, it is evident that one motor winch must lower while the other performs a hoisting operation, which requires that substantially the same hoisting and lowering speeds must be maintained in order to shift a load with the least possible delay. Furthermore, it is desirable that the motor be capable of lowering an empty hook at a high rate of speed.

The inherent characteristics of the series-type motor, which has been employed heretofore, makes it unsuitable, since its operation as a shunt motor, when performing a lowering operation, requires a complicated control system and results in very inefficient operation.

The object of my invention, generally stated, is to provide a control system for cargo-winch motors which shall be simple and efficient in operation and capable of being easily and economically manufactured.

A more specific object of my invention is to provide for controlling the shunt-field excitation of a compound-wound, direct-current winch motor in accordance with the motor load to obtain slow-speed operation for accelerating and hoisting heavy loads and high-speed operation for hoisting light loads.

A further object of my invention is to provide for operating a compound-wound direct-current winch motor as a shunt motor and controlling the excitation of the shunt field winding in accordance with the reverse power generated by the motor when operating as a generator under the influence of an overhauling load.

Another object of my invention is to provide for controlling the field excitation of a compound-wound winch motor in a manner to closely duplicate the operating characteristic of a series-wound motor when hoisting and of a shunt-wound motor when lowering a load.

Other objects of my invention will become evident from the following description, taken in conjunction with the drawings, in which, Figure 1 is a diagrammatic view of a control system embodying the features of my invention.

Fig. 2 is a schematic diagram of the control system shown in Fig. 1.

Fig. 3 is a sequence chart showing the operation of the control switches of Figs. 1 and 2.

Figure 4:
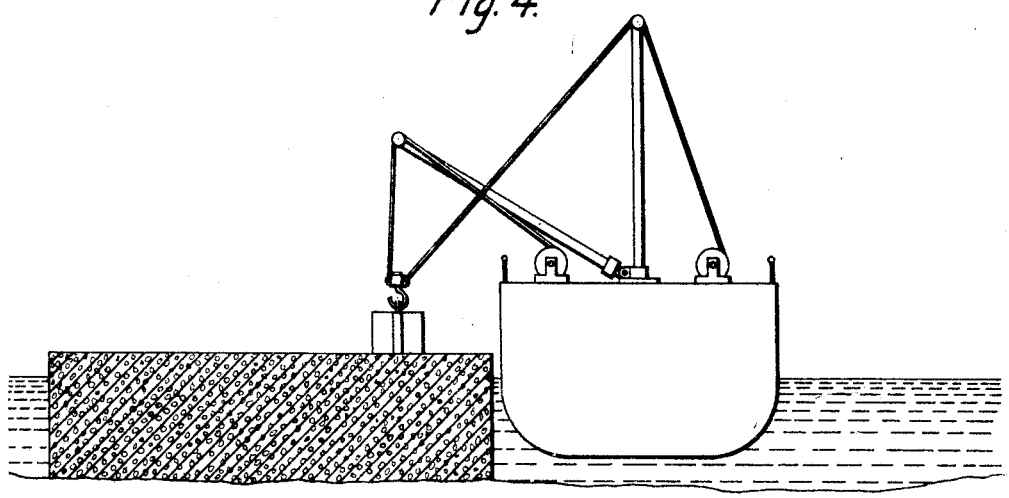
Fig. 4 is a diagrammatic view of a Burtoning-winch system to which my control system may be readily applied.

Referring to Fig. 1 of the drawings, 10 designates, generally, a direct-current motor suitable for operating cargo winches and the like. In this instance, a compound-wound direct-current motor, having a shunt field winding 11 and a series field winding 12, is provided.

The motor may be operated from any suitable source of direct-current power which, in this instance, may be illustrated by means of line conductors 13 and 14.

The operation of the motor 10 may be controlled by a controller or master switch of any suitable type to obtain forward and reverse operation for performing hoisting and lowering operations. In this embodiment of the invention, I utilize a manually-operated master switch 15 which is provided with suitable contact members for controlling the main-motor connections and the control circuit connections that will be described in detail hereinafter.

As shown, the master switch 15 may be actuated to the left, as indicated by the arrow designated "hoist" to any of a plurality of operating positions designated as $a$ to $e$, inclusive, to perform hoisting operations. In a similar manner, the master switch may be actuated to the right, as indicated by the arrow designated "lower", into any one of its operating positions $a'$ to $e'$, inclusive, to perform lowering operations.

In accordance with the usual practice, a spring-actuated brake shoe 16, provided with a release coil 17, is utilized for controlling the operation of the motor in a well known manner.

In this instance, a main-line switch 18 is utilized for connecting the master switch 15 to the line conductor 13, the line switch 18 being controlled in response to the setting of the master switch in the "off" position, as will be described in detail hereinafter.

Assuming that it is desired to operate the motor 10 in either a hoisting or lowering direction, the switch 19 may be closed to connect the conductor 20 and line switch 18 to the line conductor 13.

In this instance, the master switch 15 is arranged to establish a reset circuit for the main-line switch 18 when set in its "off" position, as shown. Accordingly, upon the closure of the switch 19, a circuit is established for operating the line switch 18. This circuit extends from line conductor 13, through switch 19, conductor 20, "stop" push button 21, conductor 22, contact finger 23 and contact segment 24 of the master switch 15, conductor 25, the actuating coil of switch 18 and conductor 26, to the line conductor 14.

With the line switch 18 in the closed position, the master switch 15 may be actuated in the hoisting or lowering direction, as desired. Assuming that the master switch 15 is actuated to the first position designated as $a$ in the hoisting direction, an energizing circuit for the winch motor 10 will be established. This circuit extends from the line conductor 13, through switch 19, conductor 20, line switch 18, conductor 27, contact finger 28, contact segment 29 of the master switch 15, conductor 30, coils 31 and 32, conductor 33, armature of the motor 10, conductors 97 and 34 contact finger 35 and segments 36 and 37 of the master switch 15, conductor 38, series field winding 12 and the starting resistor 39, to the line conductor 14.

Simultaneously with the establishment of the motor circuit, an operating circuit is completed for releasing the brake shoe 16. In this instance, a relay 41 is provided for controlling the operating circuit of the brake shoe 16. When the master switch 15 is set in position $a$, a circuit is established from the energized conductor 20, through the push-button switch 21, contact members 42 of line switch 18, conductor 25, contact fingers 43 and 44 and contact segments 45 and 46 of the master switch 15, conductors 47 and 48 and operating coil of relay 41, to the line conductor 14. Accordingly, upon the closure of relay 41, an operating circuit for the brake-operating coil 17, is established, which may be traced, from the energized conductor 20, line switch 18, conductors 27 and 49, coil 17, and relay 41, to the line conductor 14. As is shown, the contact segments 45 and 46 of the master switch 15, are disposed to maintain this circuit energized throughout the full operating range of the master switch, to maintain the brake in the open position at all times, except when the motor 10 is disconnected from the line.

It will be observed that the shunt field winding 11 of the motor 10 is connected across the source of power by means of a circuit exending from the energized conductor 20, through conductor 50, field winding 11, shunt-field resistor 51, resistor arm 52 and conductor 53, to a line conductor 14. In this embodiment of the invention, provision is made for initially controlling the excitation of the shunt field winding 11, in accordance with the operating position of the master switch, and, thereafter, in accordance with the operation of certain relays which operate automatically to control the field excitation in accordance with the load on the motor, when hoisting or lowering.

In order to provide a strong shunt-field excitation for starting and accelerating the motor, the master switch 15, when actuated to position a in the hoisting direction, is disposed to establish a bridging circuit for section 54 of the field resistor 51. The remaining sections 55, 56 and 57 of the resistor 51 are connected in series with the field winding of the motor. The energizing circuit for the field winding 11 may be traced from the source of power, through line conductor 14, conductor 58, contact finger 59 and contact segments 60 and 61 of the master switch 15 conductor 62 resistor terminal V4, resistor sections 55, 56 and 57, field winding 11, and conductor 50, to the energized conductor 20.

In order to further aid in the acceleration of the motor 10, an armature shunt resistor 63 is disposed to be connected in shunt relation to the armature of the motor 10 when the master switch is in the a position to establish a circuit extending from the lower armature terminal, through resistor 63, contact segments 64 and 65 and contact finger 66 of the master switch 15 and conductors 34 and 97, to the upper armature terminal.

In order to further accelerate the motor 10, the series resistor 39 is bridged, in a three-step operation, by bridging circuits established upon the operation of the master switch 15 to operating positions c, d and e, respectively. As shown, a bridging circuit for the first section of the resistor 39 is established through a common conductor 58, contact finger 67 and contact segments 68 and 69 of the master switch 15 and conductor 70. In a similar manner, the remaining two sections of the series resistor 39 are bridged through circuits extending from the common conductor 58, through contact finger 71 and contact segments 72 and 73 of the master switch 15, conductor 74 and another circuit extending through contact finger 75 and contact segments 76 and 77 of the master switch 15 and conductor 78.

When the master switch 13 is set in position e, the starting resistor 39 is entirely shunted from the motor circuit, and the speed of the motor is, consequently governed by the degree of excitation provided by the series field winding 12 and shunt field winding 11. It will be readily understood that the accelerating load on the motor is greater than the steady load after full speed has been attained. In many instances, the steady load is much smaller than the full-load rating of the motor, consequently, the operating speed of the motor may be increased accordingly. Therefore, provision is made for automatically decreasing the shunt field excitation in accordance with the load on the motor.

In order to control the shunt-field excitation in this manner, a load responsive relay 80 is provided, as shown. In this instance, it will be observed that the relay 80 is provided with stationary contact members 81 and 82 and a movable armature 83 that is biased to its lowermost position which will be called the open position, into engagement with the contact member 82, by means of a spring 84. When the relay armature 83 is in its uppermost or closed position it stands in engagement with contact members 81 and a bridging circuit around the resistor sections 56 and 57 is established, as shown. In order to retain the load relay 80 in the closed position during the accelerating period of the motor, to provide increased shunt field excitation, it is provided with a coil 85, which is connected across the first two sections of the starting resistor 39, and a circuit is established which extends from line conductor 14, through conductor 86, coil 85, conductors 87 and 88 and the two sections of resistor 39, to the line conductor 14 as shown. Therefore, the voltage drop across the resistor 39, while connected in the motor circuit, causes the relay 80 to be retained in its closed position and further increases the shunt-field excitation over that obtained by bridging resistor section 54 by the master switch 15. However, when the master switch 15 is actuated beyond the position d, the first two resistor sections are bridged and, therefore, the operating coil 85 of the load relay 80 becomes de-energized. It will be observed that the load relay 80 is provided with a current coil 31 which is permanently connected in the motor circuit. The current coil 31, being energized by the motor current, retains the relay 80 in the closed position until there is a predetermined reduction of load.

In the event that the steady load on the motor 10 falls below a predetermined value, the load relay 80 opens under the influence of the biasing spring 84, to effect the disengagement of its contact members 81 and 83, thereby interrupting the bridging circuit around sections 56 and 57 of the resistor 51. Accordingly, the shunt-field excitation is decreased, and the motor speed is increased a predetermined amount.

Upon the opening of the relay 80, a by-pass circuit for further decreasing the shunt-field excitation is established. As shown the by-pass circuit extends from terminal VI of resistor 51, through conductor 90, contact members 82 and 83 of the load relay 80, resistor 9 conductor 91, contact segment 92 and contact finger 93 of the master switch 15, to the energized conductor 27. In such manner, a complete change of the operating characteristic of the motor is effected in a gradual manner.

Figure 5:
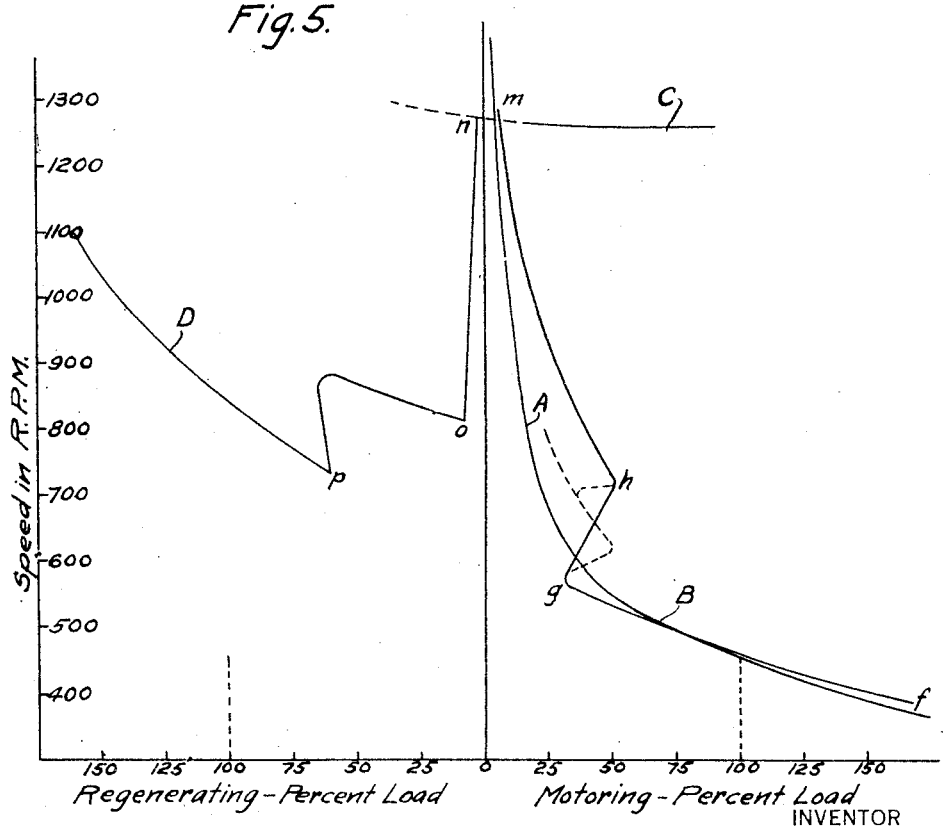
Fig. 5 is a diagram showing characteristic operating curves of a compound-wound winch motor operating in accordance with my invention.

In order that more complete understanding of the field transfer operation, as effected by the load relay 80, may be obtained, reference may be had to Fig. 5. This view shows characteristic speed-torque curves of series and compound - wound direct-current motors. Curve A shows the relation of speed to the load in a series-wound motor when performing a hoisting operation. Curve B shows the operating characteristic of a compound-wound winch motor which is obtained by the operation of the load relay 80. As shown, the lower part of the curve B, from $f$ to $g$, closely resembles that of the series motor and represents the operating characteristic of the compound-wound motor 10 before the load relay 80 becomes effective. The sudden rise in the speed denoted on the curve between $g$ and $h$ represents the transfer period caused by the operation of the load relay 80. The dotted portion of the curve between $g$ and $h$ shows how the speed of the motor actually varies. The first rise in speed is caused by the connection of the resistor sections 56 and 57 in the shunt field circuit, and the second rise in speed being caused by the establishment of the by-pass circuit, as hereinbefore described. The section of the curve between $h$ and $m$ shows the new operating characteristic which is obtained by the present system and which permits a greater operating speed than is possible to obtain from the series motor operating under the same load condition. In this instance, the slope of the curve may be changed by varying the resistor 9 in the by-pass circuit, to change the operating characteristic of the compound motor so that it may actually intersect the series characteristic at any desired point. C and D are the characteristic curves of the motor when operating as a shunt motor, performing a lowering operation which will be referred to in detail hereinafter.

From the foregoing description, it will be readily understood that the motor 10, when operating to perform hoisting operations, operates as a compound-wound motor with strong shunt-field excitation for accelerating the load and is further controlled automatically in response to the change in load to effect its operation in a high-speed manner when the steady hoisting load is below a predetermined value.

When the motor is operated in the opposite direction for performing the lowering operations, experience has shown that more desirable operation, especially when operating a Burtoning system, may be obtained by operating the motor as an ordinary shunt-wound machine. However, in order to facilitate the performance of accelerating operations, provision is made for utilizing the series-field winding of the motor for a predetermined time, thus operating it as a compound-wound machine.

In order to perform lowering operations, the master switch 15 is actuated in the lowering direction to reverse the armature connections, establishing an armature circuit for the motor which extends from the energized conductor 20 through the line switch 18, conductor 27, contact finger 95 and contact segment 96 of the master switch 15, conductor 97, armature of the motor 10, conductor 33, coils 32 and 31, conductor 30, contact finger 98 and contact segment 37, of the master switch 15, conductor 38, series field winding 12 and series resistor 39, to the line conductor 14. The engagement of the contact segment 46 and contact finger 44 of the master switch 15 effects the release of the brake shoe 16, in exactly the same manner described hereinbefore for the hoisting operation. Furthermore, the engagement of the contact segment 61 and contact finger 59 bridges section 54 of the field resistor 51 to provide a strong shunt-field excitation for starting and accelerating.

To further aid in the acceleration of the motor, the resistor 63 is connected in shunt relation to the armature upon the engagement of the contact segment 64 and contact finger 66 to remain connected until the master switch is actuated into its last operating position $e'$.

In order to operate the motor as a shunt-wound machine, provision is made for short-circuiting the series field winding 12, within a predetermined time-interval after the motor has started in the reverse direction. Any suitable type of relay may be utilized for shunting the field winding and, in this instance, an inductive time-element relay 99, is utilized. A complete description of this type of relay may be found in a co-pending application of Willard G. Cook, filed Sept. 18, 1928, Serial No. 305,755. As shown, the relay is provided with a demagnetizing coil 100 which is subjected to a constant voltage from line conductors 13 and 14. The relay 99 is further provided with a magnetizing coil 101, the energization of which may be controlled to effect the operation of the relay. In this instance the coil 101 is energized through a circuit extending from the energized conductor 25, contact fingers 43, 44 and 23 of the master switch 15, conductor 107 connected to contact finger 101 and resistor 102, to the line conductor 14. In accordance with the principle of operation of the time-element relay the demagnetizing coil 100 and the adjustable spring 100' in conjunction with the magnetizing coil 101, when shunted by the engagement of contact members provided in the master switch 15, effects the opening of the relay, within a predetermined time interval. As shown, when the relay 99 is in its open position, the engagement of its contact members 103 and 104 establishes a bridging circuit for the series field winding 12. Therefore, when the master switch 15 is set in position c', contact segment 105 engages the contact finger 43, and short circuits the magnetizing coil 101 through a circuit extending from the movable contact member of resistor 102 through conductor 106 contact segment 105 and contact finger 43 of the master switch 15, contact fingers 44 and 24, and to conductor 107, which is connected to the opposite terminal of the coil 101. Therefore, it will be readily understood that, in the event the master switch is actuated to any position between c' and e', the operation of the time element relay 99 will establish a bridging circuit for the series field 12 within a predetermined time interval, as determined by the setting of the relay.

In order to stabilize the operation of the motor 10 in the event that it is operated as a generator by an excessive lowering load, provision is made for connecting the shunt resistor 63 in shunt relation to the motor armature upon engagement of the contact finger 66 and contact segment 64, as shown.

It will be readily understood that, with the master switch 15 set in the position e', the motor 10 will operate as a shunt motor to perform lowering operations at a predetermined speed, depending upon the degree of excitation of the shunt-field winding 11. Therefore, it is evident that an empty hook or a very light load may be lowered at a high rate of speed. However, in some instances, the lowering load becomes excessive and overhauls the motor, causing it to operate as a generator. In this embodiment of the invention, provision is made for automatically increasing the shunt-field excitation in response to the development of a predetermined amount of reverse power in the motor. In order that the field resistor 51 may be varied to effect an increase in the shunt-field current, a relay 110 is provided. As shown, this relay, upon being actuated to the closed position, short circuits sections 54, 55 and 56 of the resistor 51.

In order to control the operation of the relay 110, a reverse-power relay 111, having a current coil 32 and a voltage coil 112 is provided. As shown, the voltage coil 112 is disposed to be connected in shunt relation to the armature of the motor 10 when the master switch 15 is set in any lowering position. Therefore, it is evident that the voltage coil 112 becomes energized in response to the establishment of a counter-electromotive force in the motor, and that the current coil 32 is energized in accordance with the current flowing in the main-motor circuit. In this instance, the coils 32 and 112 are wound to assist each other, when connected in this manner, and to oppose each other when the master switch is in the opposite running position which provides for effecting the operation of the relay at only such times as the motor may be subjected to an overhauling load.

Assuming that the regenerative current of the motor reaches a predetermined value, whereupon, the closure of the reverse power relay 111 is effected, and a circuit is established for effecting the closure of the resistor shunting relay 110. This circuit may be traced from the energized conductor 25, through contact fingers 43 and 44, contact segment 46, conductor 47, coil of the relay 110, contact members of the reverse power relay 111, conductor 113, back-contact member 114 of the time element relay 99 and conductor 115, to line conductor 14.

A further increase in the shunt-field excitation may be obtained, depending upon the amount of the overhauling load through the operation of the load relay 80. Since the current coil 31 of this relay is permanently connected in the motor circuit, the relay may operate to short circuit resistor sections 56 and 57, as hereinbefore described. Since the energizing circuit for the shunt field 11 now extends from the line conductor 14, through the relay 110, to the terminal V2 it is evident that the resistor sections 56 and 57, are connected in parallel-circuit relation by the operation of the load relay 80 and, therefore, further reduces the resistance in the shunt field circuit. This second increase in shunt-field excitation causes the motor to drop to a still lower speed, providing a two-step operation or transfer from the weakened field condition.

The operation of the reverse-power relay 111 and the load relay 80 in controlling the shunt-field excitation for lowering, may be understood more clearly by referring to Fig. 5. The speed-torque characteristic of the motor, when operating as a shunt motor with weakened shunt field, is illustrated by the curve C. Therefore, it is evident that, so long as the motor is taking power from the line, it will lower at a substantially constant speed, but, when the load becomes overhauling, its speed will rise, as shown by the dotted portion of the curve C. Curve D shows the operating characteristic of the motor after the shunt field excitation has been increased by the combined operations of the reverse-power and load relays. The section of the curve D between n and o, shows the drop in speed effected by the closure of the reverse-power relay, while the second part of the curve between o and p shows a second speed reduction caused by the closure of the load relay, the last part of the curve then representing the operating characteristic of the motor when lowering an overhauling load, with the master switch 15 set in the full "on" position.

It will be readily understood that a different operating characteristic is obtained for each position of the master switch. However, the operation of the reverse-power and load relays is the same in any case and, therefore, it has been deemed unnecessary to prepare curves to illustrate the operating characteristics of the motor with the master switch set in the intermediate positions.

In order to provide for dynamic braking of the motor when the master switch is actuated to the "off" position, provision is made for establishing a graduated dynamic-braking circuit.

It is well known that the braking force depends upon the armature-shunt resistance, which must be of relatively low ohmic value to control a heavy load. However, if the shunt resistor of low ohmic value is connected across the armature immediately upon the interruption of the motor circuit, the sudden rush of current resulting therefrom may cause excessive commutator flashing and consequent damage to the motor. Therefore, in this embodiment of the invention, provision is made for first utilizing a high-resistance dynamic-braking circuit, to reduce the armature current, and then a low-resistance circuit which is established within a predetermined time interval after the establishment of the first circuit.

In this instance, the high-resistance braking circuit is established in response to the engagement of contact finger 116 and contact segment 117 when the master switch 15 is actuated to the "off" position.

The high-resistance braking circuit thus established extends from the lower armature terminal, through resistor 118, contact segments 119 and 117 and contact finger 116 of the master switch 15 and conductors 34 and 97, to the opposite armature terminal.

The low-resistance braking circuit may be controlled by any suitable time-element relay. In this instance, an inductive time-element relay 120 is provided. This relay is similar to relay 99 and is provided with a demagnetizing coil 121 and magnetizing coil 122. As shown, the coil 121 is connected in series-circuit relation to the demagnetizing coil 100 of relay 99, both of which are energized at a constant potential from the line.

As shown, when the relay 120 is deenergized, the closure of its contact members 123 and 124 establishes a circuit extending from the lower armature terminal of the motor 10, through conductors 33 and 125, resistor 126, contact members 123 and 124, conductor 129, contact segment 117 and conductors 34 and 97, to the upper armature terminal.

The operation of the time-element relay 120 is controlled by the master switch 15. As shown, when the master switch is actuated either to positions $a$ and $e$ or to positions $b'$ and $e'$, an energizing circuit is established for the magnetizing coil 122. This circuit may be traced from the energized conductor 20, through push button 21, contact members 42 of the line switch 18, conductor 25, contact fingers 43 and 131, either of contact segments 132 and 133, conductor 134, coil 122 and conductors 135 and 86, to the line conductor 14. Accordingly, upon the closure of the relay 120, the low-resistance braking circuit is interrupted.

However, when the master switch 15 is set in the "off" or $a'$ position the demagnetizing coil 122 becomes deenergized, and the coil discharges through a shunt resistor 136 which in conjunction with adjustable spring 122' and demagnetizing coil 121' determines the time-element of the relay.

Therefore, it will be readily understood that a sufficient time interval is provided between the establishment of the high-resistance braking circuit and the low-resistance braking circuit, which provides a graduated braking effect. It is evident that the application of the braking force in this manner provides for slowing down the motor very quickly without imposing excessive strains upon motor or hoisting machinery.

It may be stated, in conclusion, that, while the illustrated example constitutes a practical embodiment of my invention, I do not wish to limit myself strictly to the exact details herein illustrated since modifications of the same may be made without departing from the spirit of the invention, as defined in the appended claims.

I claim as my invention:

1. In a control system for winch motors, in combination, a motor provided with shunt and series field windings, a source of power, means for controlling the direction of rotation of the motor to perform hoisting and lowering operations, means responsive to the motor load for controlling the shunt field excitation when hoisting to vary the speed of the motor in accordance with the load, and means responsive to a reversal of power through the motor when lowering to effect predetermined changes in the shunt field excitation, whereby the excitation of the motor is weakened to provide a high lowering speed for light loads and strengthened to produce a slow lowering speed for heavy overhauling loads.

2. In a control system for winch motors, in combination, a motor provided with shunt and series field windings, a source of power, means for controlling the direction of rotation of the motor to perform hoisting and lowering operations, means responsive to the motor load for controlling the shunt-field excitation when hoisting to vary the speed of the motor in accordance with the load, means responsive to the directional controlling means for bridging the series field for lowering operations, said means being disposed to bridge said field winding after a predetermined time interval thereby providing strong field excitation during such time interval for accelerating the motor, and a reverse power relay disposed to increase the shunt field excitation a predetermined amount in response to the development of reverse power in the motor when running as a generator under the influence of a heavy overhauling load.

3. In a control system for winch motors, in combination, a motor provided with shunt and series field windings, a source of power, means for controlling the direction of rotation of the motor to perform hoisting and lowering operations, means responsive to the motor load for controlling the shunt field excitation, when hoisting, to vary the speed of the motor in accordance with the load, means responsive to the directional-controlling means for bridging the series field for lowering operations, said means being disposed to bridge said field winding after a predetermined time interval thereby providing a strong field excitation during such time interval for accelerating the motor, and a reverse-power relay disposed to increase the shunt-field excitation a predetermined amount in response to the development of reverse-power in the motor when running as a generator under the influence of a heavy overhauling load, said load-responsive means being operable to further increase the shunt-field excitation in response to the overhauling load exceeding a predetermined value.

4. In a control system for hoisting motors, in combination, a motor for hoisting and lowering a variable load, said motor being provided with shunt and series field windings, a master switch disposed to be set in hoisting or lowering positions, means disposed to short circuit the series field winding in response to the actuation of the master switch into a predetermined lowering position, and means responsive to the lowering load for over-exciting the shunt field to provide a strong lowering torque in the event of the overhauling load exceeding a predetermined value.

5. In a control system for hoisting motors, in combination, a motor for hoisting and lowering a variable load, said motor being provided with shunt and series field windings, a master controller disposed to be set in hoisting or lowering positions, means disposed to short circuit the series field winding in response to the actuation of the master controller into a predetermined lowering position, and a relay disposed to force the shunt field excitation to a maximum value to provide maximum lowering torque, said relay being responsive to the reverse power in the motor.

6. In a motor-control system, in combination, a motor provided with shunt and series field windings, a source of power for the motor, means for controlling the direction of rotation of the motor, means for controlling the excitation of the shunt field winding, said means comprising manually operable means for increasing the field strength a predetermined amount for a predetermined direction of rotation, and means responsive to the motor current for further increasing the shunt-field excitation when the motor load is beyond a predetermined value, said means being disposed to automatically decrease the excitation in response to the reduction of motor current subsequent to the accelerating period.

7. In a control system for hoisting motors, in combination, a motor provided with shunt and series field windings, a source of power for the motor, a series resistor for controlling the speed of the motor, a master switch for controlling the operation of the motor, said master switch being disposed to control the series resistor, a relay disposed to control the excitation of the shunt field winding, said relay being operable in response to the accelerating current of the motor rising above a predetermined value for increasing the shunt-field excitation and responsive to a subsequent reduction of the load current below the said predetermined value for reducing the shunt field excitation, said relay, when producing reduced field excitation, being cooperative with the master switch for still further decreasing the shunt field in response to movement of the master switch beyond a predetermined speed-controlling position.

8. In a control system for hoisting motors, in combination, a motor provided with shunt and series field windings, a source of power for the motor, a controller disposed to govern the direction of operation of the motor and the excitation of the motor for a predetermined direction of rotation of the motor, means responsive to the load current of the motor for controlling the excitation of the shunt field winding, said means being disposed to provide a strong field for accelerating the motor when the load is above a predetermined value and to weaken the field excitation upon a predetermined reduction in load in response to the movement of the controller to a predetermined operating position.

9. In a control system for hoisting motors, in combination, a motor provided with shunt and series field windings, a source of power for the motor, a controller disposed to govern the direction of operation of the motor, means responsive to the position of the controller for controlling the excitation of the motor for a predetermined direction of rotation of the motor, means responsive to the load current of the motor for controlling the excitation of the shunt field winding, said means being disposed to provide a strong field for accelerating the motor when the load is above a predetermined value and to weaken the field excitation upon a predetermined reduction in load in response to the movement of the controller to a predetermined position.

In testimony whereof, I have hereunto subscribed my name this 4th day of January, 1929.

EDWARD M. CLAYTOR.